United States Patent [19]
Gramatke et al.

[11] Patent Number: 5,954,171
[45] Date of Patent: Sep. 21, 1999

[54] MOVING CONTACT

[75] Inventors: Klaus-Dieter Gramatke, Berlin; Ferdinand Lutz, Koenigswinter; Klaus Keske, Dresden; Berthold Schaub, Eppelheim, all of Germany; Franz Schmaderer, Cracow, Poland; Gunar Baier, Mannheim; Bjoern Matthias, Bad Schoenborn, both of Germany

[73] Assignee: ABB Patent GmbH, Mannheim, Germany

[21] Appl. No.: 09/020,873

[22] Filed: Feb. 9, 1998

Related U.S. Application Data

[63] Continuation of application No. PCT/EP96/03447, Aug. 5, 1996.

[51] Int. Cl.⁶ .................................. B60L 5/08; B60L 5/12
[52] U.S. Cl. .......................... 191/60.3; 191/60.4; 191/67; 191/59.1
[58] Field of Search ............................... 191/50, 55, 59.1, 191/60.3, 60.4, 67, 70

[56] References Cited

U.S. PATENT DOCUMENTS

| 5,115,405 | 5/1992 | Cathala et al. ........................ 191/60.3 |
| 5,531,301 | 7/1996 | Makino et al. ........................ 191/59.1 |
| 5,732,803 | 3/1998 | Breitbach et al. ........................ 191/55 |

FOREIGN PATENT DOCUMENTS

| 455632 | 8/1980 | U.S.S.R. ................................. 191/70 |
| 2088303 | 6/1982 | United Kingdom . |

*Primary Examiner*—S. Joseph Morano
*Attorney, Agent, or Firm*—Herbert L. Lerner; Laurence A. Greenberg

[57] ABSTRACT

The invention relates to a moving contact which has a sliding contact for the transmission of electrical power from an overhead line to an electrically powered vehicle. The overhead line can cause damage to the sliding contact, since the overhead line can be deflected vertically due to the influence of external forces. In order to prevent such damaging effects on the sliding contact, the moving contact is equipped with at least two height adjusting components. According to the invention, at least one passively sprung component and at least one component whose height can be controlled are installed between the electrically powered vehicle and the sliding contact.

4 Claims, 1 Drawing Sheet

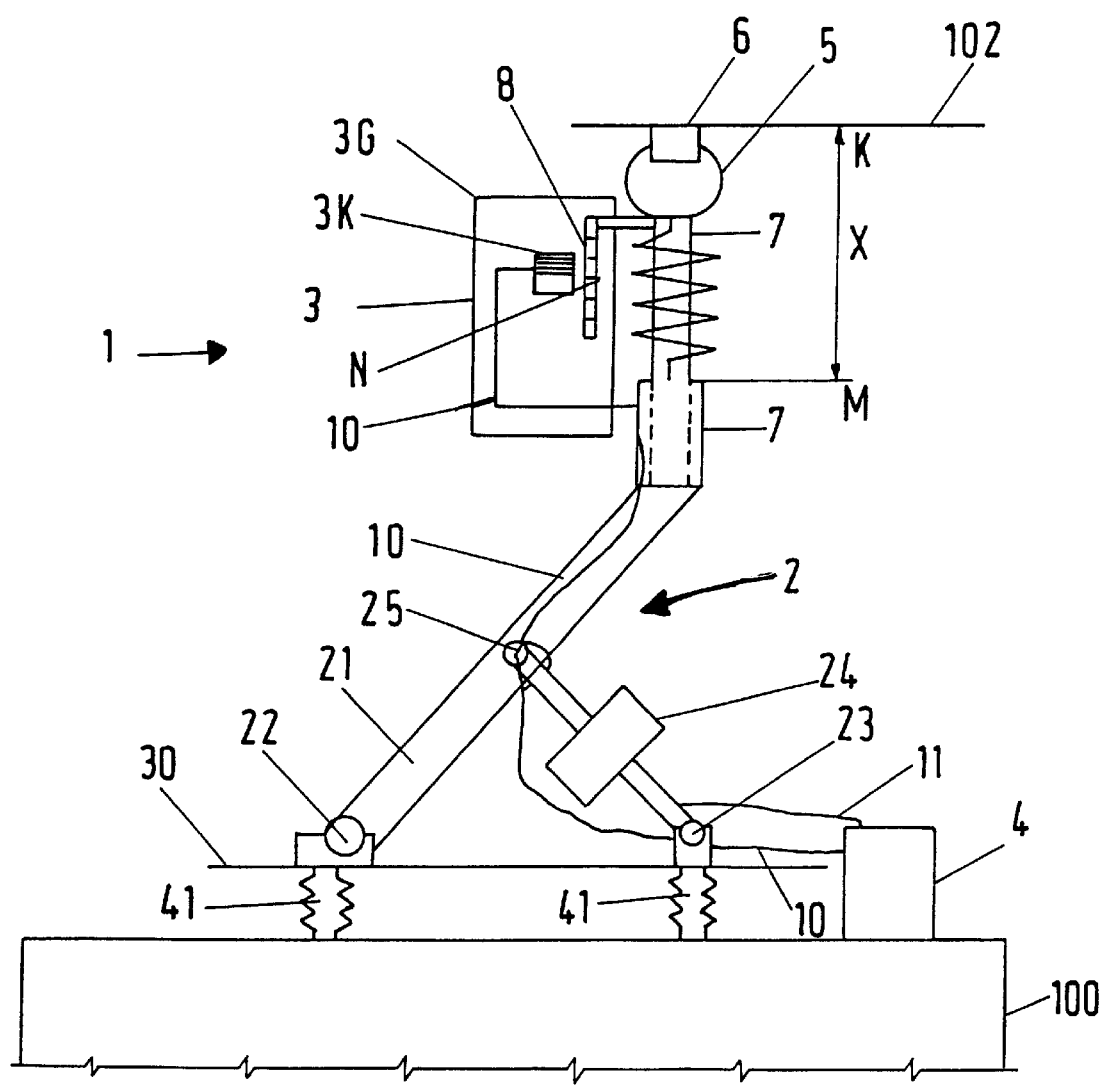

MOVING CONTACT

CROSS-REFERENCE TO RELATED APPLICATION

This application is a continuation of International Application Ser. No. PCT/EP96/03447, filed Aug. 5, 1996, which designated the United States.

BACKGROUND OF THE INVENTION

FIELD OF THE INVENTION

The invention relates to a moving contact which has a sliding contact for the transmission of electrical power from an overhead power line to an electrically powered vehicle. The overhead power line can damage the sliding contact, when the overhead line is deflected vertically due to the influence of external forces. In order to prevent such damaging effects on the sliding contact, the moving contact is equipped with at least two height adjusting components to compensate for the vertical movement of the overhead line. According to the invention, one of the components is a passively sprung component and the other component has regulated height adjusting capabilities. The height adjusting components are installed between the electrically powered vehicle and the sliding contact.

Moving contacts of this general type have the object of transmitting electrical power from an overhead power line to an electrically powered vehicle. The moving contacts which have been used until now have at least one sliding contact which is in the form of a rod and whose longitudinal axis is aligned at right angles to the longitudinal direction of the overhead line. The contact between the overhead line and the sliding contact is maintained with the aid of a retaining apparatus which is configured as a rocker arm or pantograph. It is disadvantageous in this case that the moving contact, which operates in a purely passive manner, can compensate for the oscillations of the overhead line which occur at high vehicle speeds only by increasing the restoring force, and thus by increasing the contact-pressure force of the sliding contact against the overhead line. This can be achieved only by further spreading of the retaining apparatus. In this way, the risk of contact separation between the sliding contact and the overhead line can be avoided, and the formation of arcs can be reduced. However, increased material wear on the sliding contact occurs because of the greater mechanical stresses applied to the sliding contact.

The British Patent Application No. 2,088,303 A describes a moving contact and overhead line combination used to power electrically powered vehicles. The moving contact is in the form of a telescopic strut arrangement. A rocker arm, which is in contact with the overhead line, is attached to the upward-pointing end of a rocker arm support. It is pressed against the contact wire of the overhead line by a spring, a hydraulic mechanism or a pneumatic mechanism. The rocker arm support is disposed in a moving contact tube which is installed telescopically in an extension tube. The rocker arm support can be fixed at different heights by an adjusting apparatus. A further apparatus is provided by which the position of the rocker arm support in the moving contact tube corresponding to the respective height of the contact wire can be determined. If, owing to changes in the height of the contact wire, the rocker arm support comes into the vicinity of the upper or lower limit position, the height of the moving contact tube is adjusted upwards or downwards automatically.

SUMMARY OF THE INVENTION

It is accordingly an object of the invention to provide an improved moving contact which overcomes the above-mentioned disadvantages of the prior art devices and methods of this general type, in which a moving contact whose sliding contact or sliding contacts are electrically conductively connected to the overhead line in such a manner to prevent premature mechanical wear of the sliding contact.

Damage to the moving contact is generally caused by deflections or defective guidances of the overhead line. However, the moving contact of the invention is configured such that the sliding contact or sliding contacts are not damaged, but experience only minor wear when experiencing deflections, defective guidances and the like. At the same time, it is ensured that the sliding contact or sliding contacts remain electrically conductively connected to the overhead line. The principle of the moving contact according to the invention is based on the fact that the higher-frequency vertical oscillations of the overhead line at more than 5 Hz which typically occur and, from experience, have amplitudes of less than 2 cm, are compensated for by a spring system. The low-frequency vertical oscillations of less than 5 Hz, at which amplitudes of more than 10 cm can occur, are compensated for by a controlled height adjustment of a retaining apparatus.

With the foregoing and other objects in view there is provided, in accordance with the invention, a moving contact mounted on a vehicle which has a roof for engaging to and transmitting electrical power from an electrical overhead line to the vehicle, the moving contact comprises a support which has a bottom, a sliding contact is mounted to the support; a spring system configured as a sprung leg and has a restoring force and a reference point, the restoring force of the spring system is between 40N to 100N and is matched to a combined weight of the sliding contact and the support being less than 8 kg, the support is mounted on the spring system, the sliding contact is held in an electrically conductive connection to an overhead line by the restoring force of the spring system for transmission of electrical power from the overhead line to an electrically powered vehicle on which the moving contact is mounted; a retaining apparatus has a height adjustable supporting arm, the spring system is connected to the supporting arm; a drive mechanism is connected to the supporting arm of the retaining apparatus for adjusting a height of the retaining apparatus and the sliding contact; a sensor for monitoring a distance between the reference point on the spring system and a contact point, the contact point is located between the sliding contact and the overhead line, the sensor has two optical fibers and outputs a distance measurement signal, one of the two optical fibers is a transmitter and the other of the two optical fibers is a receiver; a distance monitoring apparatus is attached to the bottom of the support, the distance monitoring apparatus has a wedge-shaped shutter measurement strip disposed between the transmitter and the receiver of the sensor; a signal line and an evaluation and control unit receives and evaluates the distance measurement signal received via the signal line connecting the evaluation and control unit to the sensor, the evaluation and control unit outputs a height adjustment signal to the drive apparatus for adjusting the height of the retaining apparatus if the monitored distance is outside a predetermined threshold interval for maintaining the electrically conductive connection between the sliding contact and the overhead line, the threshold interval has a length of 10 cm.

In accordance with an added feature of the invention, there are provided insulators and a mounting plate which has a first joint and a second joint, the supporting arm is configured in one-piece and has a first end mounted to the first joint of the mounting plate, and the drive apparatus has a first end mounted to the second joint, and the mounting plate is mounted, via the insulators, on a roof of the electrically powered vehicle.

In accordance with an additional feature of the invention, there is a joint connecting the drive apparatus to the supporting arm, the joint transmits drive forces from the drive apparatus to the supporting arm, and the supporting arm has a second end connected to the spring system for always aligning a longitudinal axis of the spring system at right angles to the overhead line.

In accordance with a concomitant feature of the invention there are provided insulators and a mounting plate which has a first joint and a second joint, the supporting arm is formed of two-pieces and has a first end mounted to the first joint of the mounting plate, and the drive apparatus has a first end mounted to the second joint, and the mounting plate is mounted, via the insulators, on a roof of the electrically powered vehicle.

Other features which are considered as characteristic for the invention are set forth in the appended claims.

Although the invention is illustrated and described herein as embodied in a moving contact, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a diagrammatic, side-elevational view of a moving contact according to the invention.

DESCRIPTION OF THE PREFERRED EMBODIMENTS

Referring now to the single FIGURE of the drawing in detail, there is shown a moving contact 1. The moving contact 1 is essentially formed of a retaining apparatus 2, a sensor 3, an evaluation and control unit 4, a support 5 for a sliding contact 6, and a spring system 7. The retaining apparatus 2 is mounted on a mounting plate 30. The mounting plate 30 is installed, via insulators 41, on a roof of an electrically powered vehicle 100, which is not illustrated in detail. The retaining apparatus 2 is formed of a supporting arm 21 which can move in a direction of the vehicle 100. A first end of the supporting arm 21 is connected to the mounting plate 30, via a joint 22. A pantograph, which is configured as a half-pantograph moving contact, can also be used instead of the retaining apparatus 2. This is a form of structure which is already in widespread use, belongs to the prior art, and is therefore not explained here in more detail. A drive apparatus 24 is likewise mounted on the mounting plate 30 via a joint 23. The drive apparatus 24 is configured as a hydraulic cylinder in the case of the embodiment illustrated here, whose second end acts centrally on the supporting arm 21, via a joint 25. It is also possible to configure the drive apparatus 24 as a pneumatic or electromechanical drive. The supporting arm 21 may also be formed of two parts which are connected to one another via a joint (not illustrated here). In this case, the drive apparatus 24 is connected to that part of the supporting arm 21 which is disposed closest to an overhead power line 102. Such a configuration of the supporting arm 21 has the advantage that wind forces can be compensated for more easily. The supporting arm 21 is manufactured from fiber-reinforced plastic in both cases. This ensures the required high stiffness level of the structure.

The spring system 7 is installed at a second end of the supporting arm 21. In the case of the exemplary embodiment illustrated here, the spring system 7 is configured as a spring leg. However, other spring systems can also be used, for example, pneumatic springs. The spring system 7 has a restoring force which is directed against the sliding contact 6 and the support 5 and whose magnitude is matched to the weights of the sliding contact 6 and of the support 5. In order to keep these weights low, the sliding contact 6 is manufactured from carbon, and the support 5 from a fiber-composite material. The weight of the two components 5 and 6 is less than 8 kg in the case of the exemplary embodiment illustrated here. Two sliding contacts (not illustrated here) can also be used instead of one sliding contact 6. In this case, the magnitude of the restoring force needs to be matched to this, or the weight of the two sliding contacts needs to be selected such that the weights of the sliding contacts and the weight of the support 5 amount to less than 8 kg together. The restoring force of the spring system shown here is selected to be 40 to 100 N, preferably 60 to 80 N, which is greater than the weight force resulting from the mass of the components 5 and 6.

The spring leg 7 is mounted on the supporting arm 21 such that its longitudinal axis always runs at right angles to the overhead line 102. This is achieved using common connecting devices which are already known in the prior art and are therefore not explained in more detail here. The sliding contact 6 is secured to the top of the support 5. The other end of the support 5 is attached to the second end of the spring leg 7. A measurement strip 8 is secured to the bottom of the support 5. The scanning head 3K of the sensor 3 is installed directly in front of the measurement strip 8. The measurement strip 8 and the scanning head 3K are surrounded by a housing 3G for protecting the measurement strip and the sensor from the environment. In the case of the exemplary embodiment illustrated here, the scanning of the measurement strip 8 is carried out using an optical fiber. The respective distance X between a fixed reference point M on the sprung leg 7 and the contact point K between the sliding contact 6 and the overhead line 102 is measured continuously by the sensor 3. It is possible to configure the measurement strip 8 as a wedge-shaped aperture which is disposed between an optical fiber as a transmitter, and an optical fiber as a receiver. The optical beam is attenuated differently depending on the position of the wedge-shaped aperture, and the received optical power is changed in a corresponding manner. The distance measurement can, of course, also be carried out inductively or capacitively, using an appropriately configured scanning head 3K and a measurement strip 8 suitable for this purpose.

A signal line 10 is routed from the scanning head 3K to the evaluation and control unit 4. The latter can be installed on the roof of the electrically powered vehicle 100, as illustrated here, or inside the vehicle 100. The signal line 10 is routed partially through the supporting arm 21. In the case of the optical version of distance measurements, the signal line 10 is an optical fiber. The optical distance measurement configuration has the advantage that no electrical or electronic components need to be fitted on the moving contact. As a consequence, no measures for protecting against electromagnetic fields are required. The signal output of the evaluation and control unit 4 is connected via a signal line 11 to the drive apparatus 24.

The method of operation of the moving contact 1 according to the invention will now be described in more detail. As already mentioned at the start, the vertical position of the contact point K between the overhead line 102 and the sliding contact 6 varies while the sliding contact 6 is in motion. This is caused on the one hand by the structural configuration of the overhead line 102 and, on the other hand, the overhead line 102, which is connected to the sliding contact 6, is caused to oscillate by forces which act on it. In order to ensure an undisturbed electrically conductive connection between the sliding contact 6 and the overhead line 102 for continuous conveyance of electrical power from the overhead line 102 to the electrically powered vehicle 100, the sliding contact 6 must follow the vertical deflections experience by the overhead line 102. This is the case when the moving contact 1 is pressed against the overhead line 102 by more than 40 N. On the other hand, contact-pressure forces of more than about 150 N should be avoided to prevent premature mechanical wear of the sliding contact 6 and of the overhead line 102. Any vertical deflection of the overhead line 102 leads to a change in the distance X between the contact point K of the sliding contact 6, which is mounted in a sprung manner, and the fixed reference point M. In order to keep the sliding contact 6 continuously electrically conductively connected to the overhead line 102, the moving contact 1 is equipped, on the one hand, with the spring system 7 and, on the other hand, with the retaining apparatus 2, whose height adjustment can be controlled. The change in the distance X between the reference point M and the contact point K between the sliding contact 6 and the overhead line 102 is measured. The measurement accuracy of the sensor 3 is greater than 0.1 cm. It is assumed in the following description that the reference point M is at a distance X from the contact point K in the ideal case. The measurement strip 8 is then positioned with its measurement point N(X) directly in front of the scanning head 3K. The spring system 7 is configured such that the contact-pressure force of the sliding contact 6 on the overhead line 102 is 60 to 80 N, as long as the distance X is in a range of X1 to X2.

The range X1 to X2 having a magnitude of about 10 cm. As long as the vertical deflection of the overhead line 102 does not lead to the distance X becoming greater or less than the predetermined range limits X1 and X2, it is ensured that the contact-pressure force is adequate for electrical power transfer and, at the same time, the contact-pressure force is not so large that premature wear will occur. Irrespective of the sliding contact 6 following the vertical deflections of the overhead line 102 in this way with the aid of the spring system 7, measurement signals are transmitted continuously from the scanning head 3K to the evaluation and control unit 4, because the measurement strip 8 moves past the scanning head 3K whenever any change in the distance X between the reference point M and the contact point K occurs, and the change is detected by the scanning head 3K. If the evaluation and control unit 4 finds that the change in the height of the sliding contact 6 is reaching either the upper or lower limit value N(X1) or N(X2), the drive apparatus 24 is activated by an output signal of the evaluation and control unit 4. The supporting arm 21 is raised or lowered with the aid of the drive apparatus 24, to such an extent that the distance X between the reference point M and the contact point K to the overhead line 102 remains in the distance range of X1 to X2. This ensures that the electrically conductive contact between the sliding contact 6 and the overhead line 102 is maintained even if the vertical deflection of the overhead line is greater ±10 cm. The adjustment of the height of the moving contact 1 results in it being possible, if necessary, for the sliding contact 6 to move by more than 10 cm to follow a deflection of the overhead line 102 of more than 10 cm upwards, so that the electrically conductive contact is never broken. In the event that the overhead line 102 is deflected vertically downwards, the sliding contact 6 can deflect in response to the pressure from the overhead line 102 to such an extent that wear of its surface is avoided, but the contact is maintained in this case as well.

We claim:

1. A moving contact mounted on a vehicle having a roof for engaging to and transmitting electrical power from an electrical overhead line to the vehicle, the moving contact comprising:

a support having a bottom;

a sliding contact mounted to said support;

a spring system configured as a sprung leg and having a restoring force and a reference point, said restoring force of said spring system is between 40N and 100N and is matched to a combined weight of said sliding contact and said support being less than 8 kg, said support mounted on said spring system, said sliding contact held in an electrically conductive connection to an overhead line by said restoring force of said spring system for transmission of electrical power from the overhead line to an electrically powered vehicle;

a retaining apparatus having a height adjustable supporting arm, said spring system connected to said supporting arm;

a drive mechanism connected to said supporting arm of said retaining apparatus for adjusting a height of said retaining apparatus and said sliding contact;

a sensor for monitoring a distance between said reference point on said spring system and a contact point, said contact point located between said sliding contact and the overhead line, said sensor having two optical fibers and outputting a distance measurement signal, one of said two optical fibers being a transmitter and another of said two optical fibers being a receiver;

a distance monitoring apparatus attached to said bottom of said support, said distance monitoring apparatus having a wedge-shaped shutter measurement strip disposed between said transmitter and said receiver of said sensor;

a signal line; and an evaluation and control unit for receiving and evaluating said distance measurement signal received via said signal line connecting said evaluation and control unit to said sensor, said evaluation and control unit outputting a height adjustment signal to said drive mechanism for adjusting the height of said retaining apparatus if the monitored distance is outside a predetermined threshold interval for maintaining the electrically conductive connection between said sliding contact and the overhead line, the threshold interval having a length of 10 cm.

2. The moving contact according to claim 1, including insulators and a mounting plate having a first joint and a second joint, said supporting arm configured in one-piece and having a first end mounted to said first joint of said mounting plate, and said drive mechanism having a first end mounted to said second joint, and said mounting plate mounted, via said insulators, on a roof of the electrically powered vehicle.

3. The moving contact according to claim 1, including a joint connecting said drive mechanism to said supporting arm, said joint transmitting drive forces from said drive mechanism to said supporting arm, and said supporting arm having a second end connected to said spring system for always aligning a longitudinal axis of said spring system at right angles to the overhead line.

4. The moving contact according to claim 1, including insulators and a mounting plate having a first joint and a second joint, said supporting arm formed of two-pieces and having a first end mounted to said first joint of said mounting plate, and said drive mechanism having a first end mounted to said second joint, and said mounting plate mounted, via said insulators, on a roof of the electrically powered vehicle.

* * * * *